UNITED STATES PATENT OFFICE.

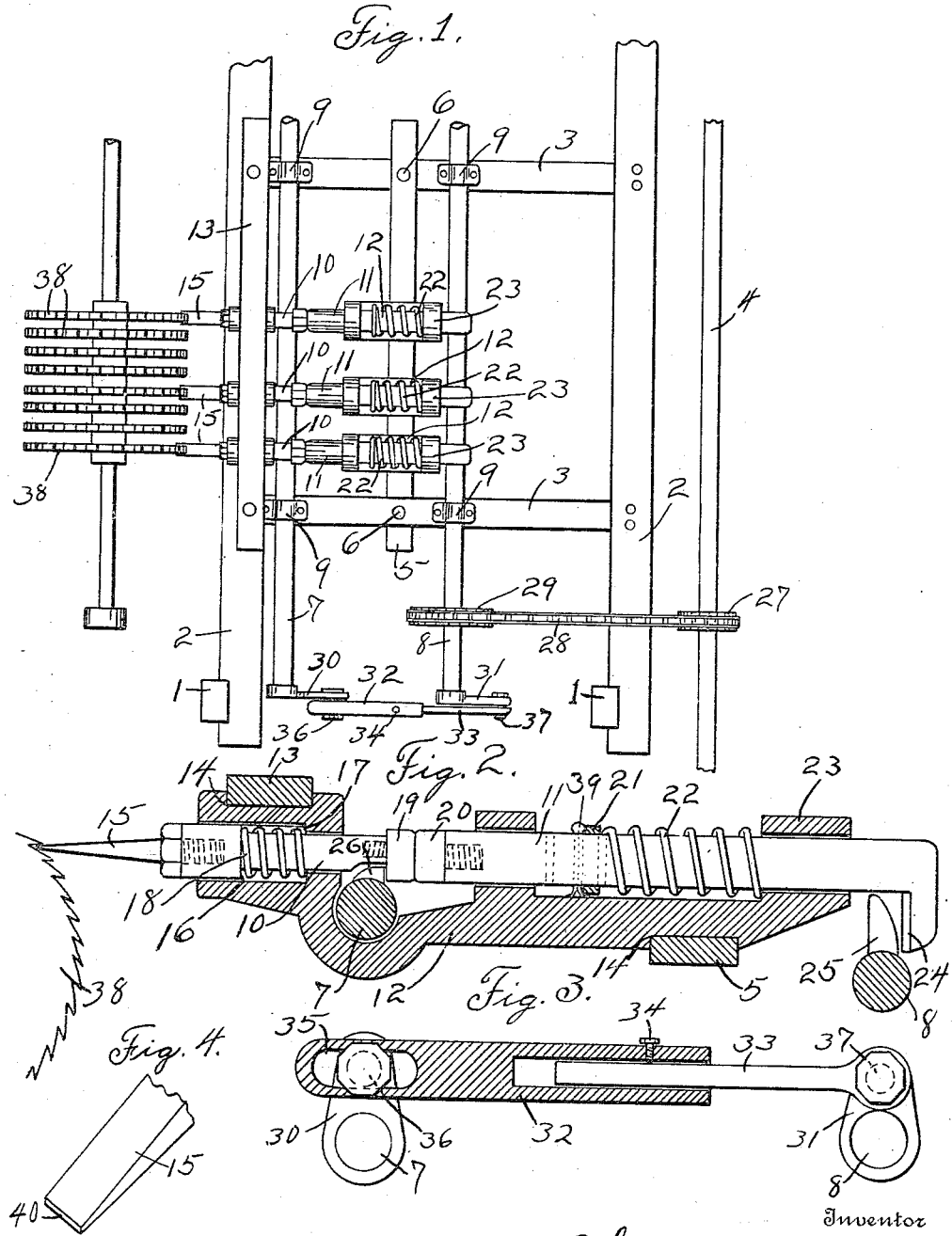

CHARLES W. EADS, OF ALTUS, OKLAHOMA.

GIN AND LINTER SAW-TOOTH CUTTER.

1,265,758.  Specification of Letters Patent.  Patented May 14, 1918.

Application filed June 26, 1917. Serial No. 176,963.

*To all whom it may concern:*

Be it known that I, CHARLES W. EADS, a citizen of the United States of America, residing at Altus, in the county of Jackson and State of Oklahoma, have invented certain new and useful Improvements in Gin and Linter Saw-Tooth Cutters, of which the following is a specification.

My invention relates to gin saw teeth cutting machines and more particularly to machines for cutting out the throats of saw teeth with a shear cut chisel instead of using files; and the object is to provide a simple machine which is highly efficient in cutting out the throats of the saw teeth and which is adapted for mounting on the frames of filing machines which are already in service and on the market, and to provide a machine which is simple in operation and which can be manufactured at relatively small cost. Another object is to furnish chisels which are provided with shear cut or square points instead of points which are ground sharp. Other objects and advantages will be fully explained in the following description and the invention will be more particularly pointed out in the claims.

Reference is had to the accompanying drawings which form a part of this application.

Figure 1 is a plan view of a gin and linter saw tooth cutter mounted on a frame of a gin saw filing machine. Fig. 2 is an enlarged vertical section of the bearings and a side elevation of the chisel operating plungers mounted in the bearings. Fig. 3 is a detail view, partly in section, of the connecting rod and cranks for driving the plunger or cam-operated shafts. Fig. 4 is a detail view of one of the chisels, showing the shear cut end of the chisel.

Similar characters of reference are used to indicate the same parts throughout the several views.

The drawings show a part of a gin saw filing machine frame, consisting of upright posts 1, longitudinal beams 2 and cross bars 3, and a line shaft 4.

The improved cutting machine or attachment is mounted on the filing machine frame. A bar 5, preferably of iron, is mounted on and attached to the cross-bars 3 by suitable bolts 6 or other attaching devices. Cam shafts 7 and 8 are journaled in bearings 9 which are attached to the bars 3 by suitable bolts. A series of chisel carrying plungers 10 and a series of driving plungers 11 are provided and a series of plunger guides 12 are provided for the plungers 10 and 11. These guides are mounted on the bar 5 at one end and on the frame piece 2 at the other or forward end. At the forward end the guides or guide bearings 12 are clamped down on the frame piece 2 by a bar 13, preferably of iron. Each casting 12 has recesses or cross grooves 14 to receive the bars 5 and 13.

The plunger 10 carries the chisel 15 and is provided with a shoulder 16 and the casting 12 has an annular shoulder 17. A spiral spring 18 is mounted on the plunger 10 between the shoulder 17 and the annular shoulder 16. The plunger 10 has a head 19 with a shank screwed into the plunger 10. The actuating plunger 11 has a head 20 with a shank screwed into the plunger 11 and has an annular collar 21 rigid therewith. A spiral spring 22 is mounted on the plunger 11 between the collar 21 and the guide member 23. The spring 22 will be compressed between the collar 21 and the guide member 23. The plunger 11 has a depending lug or abutment 24 which is to be engaged by the cam 25 which is rigid with the shaft 8. The shaft 7 has a cam 26 rigid therewith which is adapted to engage the head 19 of plunger 10 for actuating the plunger.

The shaft 8 is driven by a sprocket wheel 27 which is rigid with the filing machine shaft, the sprocket chain 28, and by the sprocket wheel 29 which is rigid with the cam shaft 8. The shaft 7 is a rocker shaft and is actuated from the cam shaft 8. The shaft 7 has a bell crank 30 and the shaft 8 has a crank 31 rigid therewith. A connecting rod in two parts 32 and 33 is pivotally connected to the cranks 30 and 31. The part 33 projects into the part 32 and is secured in place by a set screw 34. By such construction the connecting rod is adjustable. This is necessary in order to set the crank 30 to rock the shaft 7 the required turn of the shaft. The connecting rod member 32 has a slot 35 which receives the crank pin 36. The connecting rod member 33 is pivotally connected to the crank pin 37.

In operation, the shaft 8 is driven from the shaft 4 and the shaft 8 rocks the shaft 7 through the connecting rod and cranks 30 and 31. The cam 26 will actuate the plunger 10 to raise the chisel from the throat of the saw teeth. As soon as the cam 26 releases the head 19, the spring 18 will thrust the plunger 10 forward and set the chisel 15 in the next throat. The feeding of the saw teeth of the saws 38 is accomplished by the mechanism of the filing machine and will not here be described because the feeding of the saw teeth is not a part of my invention. The slot 35 is formed in the connecting rod so that the connecting rod will ride on the pin 36 and must be so adjusted that the pin reaches the end of the slot just before the crank 31 goes over its center. As the crank 31 goes on over center, the connecting rod lifts the bell crank 30 about one-fourth of an inch which action moves cam shaft 7 just enough to raise or withdraw the plunger 10 to draw the chisel out of the saw teeth. When crank 31 passes over the center, the spring 17 will actuate the plunger 10 and set the chisel as above stated, and the connecting rod member 32 by reason of the slot 35 rides on the crank pin 36 until the crank 31 completes its revolution. Briefly, the cam 26 lifts the chisel out of the saw teeth and compresses the spring 17. As soon as the spring 17 is released, it will set the chisel in the next throat. The cam 25 will compress the spring 22 and as soon as the cam 25 releases the lug 24, the spring 22 will actuate the plunger 11 to hammer on plunger 10 to to cause the chisel to do the cutting. The shaft 7 is merely rocked, the plunger 10 requiring a less motion than the plunger 11. The shaft 8 is revolved for actuating the cam 25 to compress spring 22. The collar or washer 21 may be set at different positions on the plunger 11 to regulate the tension of the spring 22 and the collar is held in place by a cotter pin 39.

The chisel 15 has the end 40 cut at right angles to the length of the chisel, making a shear cut instead of a sharp point. This form of chisel has been demonstrated in service to be highly efficient for the purpose set forth.

The point or cutting edge of the chisel is ground square instead of sharp which gives it a shearing cut which pushes metal of the throat of the teeth out on each side of the saw instead of moving the saw teeth. This operation leaves the teeth straight and of the same pitch as they are originally made. In the case of a sharp pointed chisel, there is a displacement to make room for the chisel when the chisel is driven and the teeth are pushed back. When the shear cut chisel is used, there is a displacement, but the displacement is in the form of a bur which is pushed on each side of the teeth and the burs are of an advantage because they do their part in scraping off the lint of the seed when the machine is used as a delinting machine.

What I claim, is,—

1. A gin saw tooth cutter comprising a frame, a series of plunger guides mounted on said frame, a chisel carrying plunger and a driving plunger mounted in each guide, springs (one for each plunger) for driving said plungers, a rocker-shaft provided with cams for retracting and releasing the chisel carrying plungers, a driving shaft provided with cams for retracting and releasing the driving plungers, and means operatively connecting said driving shaft and said rocker shaft whereby said driving shaft automatically actuates said rocker-shaft.

2. A gin saw tooth cutter comprising a frame, a series of plunger guides mounted on said frame, a chisel carrying spring-actuated plunger and a driving plunger mounted in each guide, a chisel carried by each chisel carrying plunger, a shaft provided with a series of cams for retracting the chisel carrying plungers and springs for setting the chisels in the throats of the saw teeth, and means for causing said driving plungers to hammer on said chisel carrying plungers.

3. A gin saw tooth cutter comprising a frame, a series of plunger guides mounted on said frame, a series of chisel carrying plungers mounted in said guides and provided with detachable heads, a series of driving plungers mounted in said guides and provided with detachable heads, a series of cams and a series of springs for actuating the chisel carrying plungers for setting the chisels in the throats of the saw teeth, and a series of cams and a series of springs for actuating said driving plungers to cause the same to hammer on the heads of said chisel carrying plungers.

4. A gin saw tooth cutter comprising a frame, a series of plunger guides mounted on said frame, a chisel carrying plunger and a driving plunger mounted in each guide, a shaft provided with a cam for drawing said chisel carrying plunger for drawing the chisel from the throat of a saw tooth and a spring for actuating said plunger to set the chisel in the throat of the saw tooth, a spring for actuating said driving plunger, and a shaft provided with a cam for compressing said spring and releasing said plunger after compressing said spring for causing said driving plunger to hammer on said chisel carrying plunger.

5. A gin saw tooth cutter comprising a frame, a series of plunger guides mounted on said frame, a chisel carrying plunger and a driving plunger mounted in each guide, a spring and a rocker cam shaft for actuating said chisel carrying plunger, a spring and a cam shaft for actuating said driving plunger, cranks for said shafts, and an adjustable connecting rod pivotally connected to said cranks whereby said driving shaft rocks said rocker-shaft, and means for driving said driving shaft.

6. A gin saw tooth cutter comprising a frame, a series of plunger guides mounted on said frame, chisel carrying plungers mounted in said guides, chisels carried by said plungers, each chisel having a shear cut end for cutting out the throats of saw teeth, and means for actuating said plungers.

7. A gin saw cutter comprising a frame, a series of chisels operatively mounted on said frame, each chisel having its blade terminated by a flat surface at right angles to the length thereof, means for setting said chisels in the throats of the saw teeth, and means for driving the chisels.

In testimony whereof, I set my hand, this 21 day of June, 1917.

CHARLES W. EADS.